United States Patent

Sekiguchi et al.

Patent Number: 5,837,161
Date of Patent: Nov. 17, 1998

[54] LIQUID CRYSTAL COMPOSITION AND LIQUID CRYSTAL DISPLAY DEVICE

[75] Inventors: Yasuko Sekiguchi; Katsuyuki Murashiro; Fusayuki Takeshita; Tetsuya Matsushita; Etsuo Nakagawa, all of Chiba, Japan

[73] Assignee: Chisso Corporation, Osaka, Japan

[21] Appl. No.: 822,688

[22] Filed: Mar. 24, 1997

[30] Foreign Application Priority Data

May 8, 1996 [JP] Japan ................................. 8-139441

[51] Int. Cl.⁶ ........................... C09K 19/34; C09K 19/30; C09K 19/12
[52] U.S. Cl. ................................. 252/299.61; 252/299.01; 252/299.63; 252/299.64; 252/299.66; 252/299.67; 428/1
[58] Field of Search ........................ 252/299.01, 299.61, 252/299.63, 299.64, 299.66, 299.67; 428/1

[56] References Cited

U.S. PATENT DOCUMENTS

| | | | |
|---|---|---|---|
| 4,779,960 | 10/1988 | Kozaki et al. | 350/346 |
| 5,055,224 | 10/1991 | Sage et al. | 252/299.63 |
| 5,102,577 | 4/1992 | Uchida et al. | 252/299.01 |
| 5,207,944 | 5/1993 | Sawada et al. | 252/299.01 |
| 5,258,135 | 11/1993 | Uchida et al. | 252/299.63 |
| 5,354,503 | 10/1994 | Sawada et al. | 252/299.63 |

Primary Examiner—Shean C. Wu
Attorney, Agent, or Firm—Wenderoth, Lind & Ponack, L.L.P.

[57] ABSTRACT

Liquid crystal compositions having a small value of γ ($V_{10}/V_{90}$) and a small τ (fast response speed) in order to cope especially with high speed response, while satisfying various characteristics required of STN display mode. These compositions comprise at least one compound expressed by formula (I) as a first component; expressed by any one of formulas (II-a) to (II-d) as a second component; and expressed by formula (III) or (IV) as a third component; and as a fourth component, a chiral component in the amount necessary for maintaining the ratio d/P of the cell thickness d (μm) to the pitch length of twist P (μm) in the range of 0.4 to 0.6 when the liquid crystal composition is used for liquid crystal display devices.

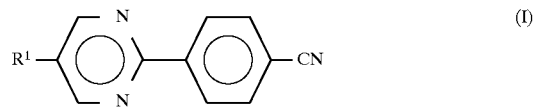

(I)

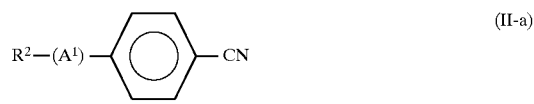

(II-a)

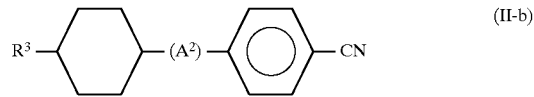

(II-b)

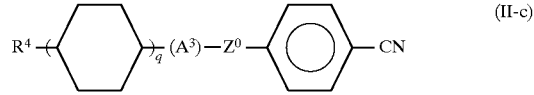

(II-c)

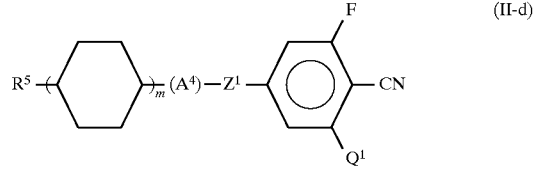

(II-d)

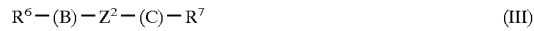

(III)

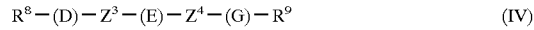

(IV)

wherein $R^1$ to $R^9$ represent an alkyl group having 1 to 10 carbon atoms; $Z^0$ to $Z^4$ represent, for example, —$CH_2CH_2$—; $A^1$ to $A^4$, B, C, E, and G independently represent, for example, 1,4-cyclohexylene or 1,4-phenylene; D represents 1,4-cyclohexylene or 1,3-pyrimidine-2,5-diyl; $Q^1$ represents H or F; and q and m are independently 0 or 1.

12 Claims, No Drawings

LIQUID CRYSTAL COMPOSITION AND LIQUID CRYSTAL DISPLAY DEVICE

TECHNICAL FIELD

The present invention relates to a nematic liquid crystal composition. More specifically, the present invention relates to a nematic liquid crystal composition which comprises a chiral component and is preferable for super twist birefringence (STN) mode, and relates to a liquid crystal display device comprising the liquid crystal composition.

BACKGROUND ART

Liquid crystal display devices (LCDs) have been obtained by filling a liquid crystal composition in a sealed cell formed between two substrates provided with a transparent electrode. Since the LCDs are small in consumption of electric power compared with CRT (of cathode-ray tube type) displays, and their down-sizing and lightening of their weight are possible, they were used in practice in twist nematic (TN) mode, super twist birefringence (STN) mode, and active matrix (AM) LCD mode in turn.

Among these, display devices of STN mode in which molecular orientation of the liquid crystals filled between upper and lower substrates are twisted to 180° to 270°, and proposed by T. J. Scheffer et al. (Appl. Phy. Lett., 45 (10), 1021 (1984)) have widely been used in such applications as personal computers and word processors.

In liquid crystal compositions for LCDs of STN mode, following characteristics are required:

(1) Viscosity ($\eta$) is low to make response speed ($\tau$) fast (to make $\tau$ small) as much as possible.
(2) They exhibit a nematic liquid crystal phase in a wide temperature range including room temperature, and phase transition temperature of nematic-isotropic (clearing point) is high in particular.
(3) In order to reduce consumption of electric power, threshold voltage is low.
(4) They can have a suitable refractive index (optical) anisotropy ($\Delta n$) depending on liquid crystal display devices.
(5) In order to increase the contrast of liquid crystal display devices, voltage-transmission characteristic is preferably steep. Thus, the value of $\gamma$ ($V_{10}/V_{90}$) is small.

That is, whereas the requirement for developing LCDs of high speed response with an aim of coping with moving pictures has recently been strengthened, it is necessary to develop liquid crystal compositions of low viscosity in order to achieve the high speed response since the response speed ($\tau$) is proportional to the viscosity ($\eta$) of liquid crystal compositions.

Further, since driving of LCDs with a battery became possible, development of LCDs on the premise of their outdoor uses has come to be studied. In order that liquid crystal compositions stand outdoor uses, it is necessary that the compositions exhibit a nematic liquid crystal phase even in a domain exceeding the temperature range at which the compositions are used, and thus it becomes necessary to expand the range of liquid crystal phase more.

As will be understood from the description below, the liquid crystal compositions of the present invention comprise, as a first component, a cyanopyrimidine expressed by formula (I), and such liquid crystal compositions are disclosed, for example, in Laid-open Japanese Patent Publication Nos. Hei 5-17774 and Hei 5-32971.

However, these known liquid crystal compositions have defects that viscosity is high (accordingly, response speed is slow) and besides, miscibility at low temperatures is poor, since they do not comprise a liquid crystalline compound having a negative or small positive dielectric anisotropy ($\Delta \epsilon$).

As discussed above, whereas liquid crystal compositions are diligently being studied, it still can not be said to be sufficient and it is a current situation that improvements are all the time required.

DISCLOSURE OF THE INVENTION

An object of the present invention is to provide liquid crystal compositions having a small value of $\gamma$ ($V_{10}/V_{90}$) and a small $\tau$ (fast response speed) in order to cope especially with a high speed response, while satisfying various characteristics required of the STN display mode described above.

As a result of diligent study by the present inventors on compositions comprising various liquid crystalline compounds in order to achieve the objects, the present invention has been accomplished.

Liquid crystal compositions of the present invention comprise, as a first component, a compound expressed by formula (I)

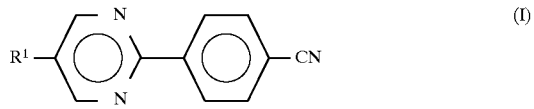

wherein $R^1$ represents an alkyl group having 1 to 10 carbon atoms and any one or not adjacent two or more methylene group (—CH$_2$—) in the alkyl group may be replaced by oxygen atom (—O—) or —CH=CH—, as a second component, at least one compound expressed by any one of formulas (II-a) to (II-d)

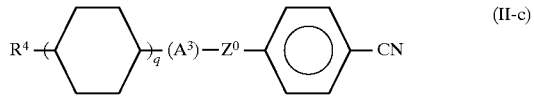

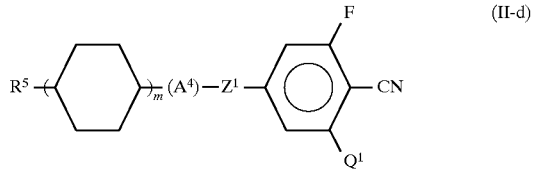

wherein $R^2$, $R^3$, $R^4$, and $R^5$ independently represent an alkyl group having 1 to 10 carbon atoms and any one or not adjacent two or more methylene group (—CH$_2$—) in each of the alkyl groups may be replaced by oxygen atom (—O—) or —CH=CH—; $Z^0$ represents —COO— or —CH$_2$CH$_2$—; $Z^1$ represents —CH$_2$CH$_2$—, —COO—, or single bond; $Q^1$ represents H or F; $A^1$ represents 1,4-cyclohexylene, 1,4-phenylene, or 1,3-dioxane-2,5-diyl; A2 and $A^3$ independently represent 1,4-cyclohexylene or 1,4-phenylene; $A^4$ represents 1,4-cyclohexylene, or 1,4-phenylene whose H atom at a lateral position may be replaced by F; and q and m are independently 0 or 1, as a third component, at least one compound expressed by formula (III) or formula (IV)

(III)

wherein $R^6$ and $R^7$ independently represent an alkyl group having 1 to 10 carbon atoms and any one or not adjacent two or more methylene groups (—CH$_2$—) in the alkyl group may be replaced by oxygen atom or —CH=CH—; B represents 1,4-cyclohexylene, 1,3-pyrimidine-2,5-diyl, or 1,4-phenylene; C represents 1,4-cyclohexylene or 1,4-phenylene; and $Z^2$ represents —C≡C—, —COO—, —CH$_2$CH$_2$—, —CH=CH—, or single bond,

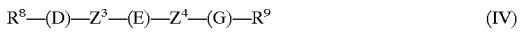
(IV)

wherein $R^8$ and $R^9$ independently represent an alkyl group having 1 to 10 carbon atoms and any one or not adjacent two or more methylene groups (—CH$_2$—) in the alkyl group may be replaced by oxygen atom (—O—) or —CH=CH—; D represents 1,4-cyclohexylene or 1,3-pyrimidine-2,5-diyl; E represents 1,4-cyclohexylene, or 1,4-phenylene H in a side position in which phenylene may be replaced by F; G represents 1,4-cyclohexylene or 1,4-phenylene; $Z^3$ represents —CH$_2$CH$_2$— or single bond; and $Z^4$ represents —C≡C—, —COO—, —CH=CH—, or single bond; and as a fourth component, a chiral component in at least the amount necessary for maintaining the ratio d/P of the cell thickness d ($\mu$m) to the pitch length of twist P ($\mu$m) in the range of 0.4 to 0.6 when the liquid crystal composition is used for liquid crystal display devices.

Liquid crystal compositions of the present invention may further independently comprise, as a fifth component, at least one compound expressed by the following formula (V) or formula (VI), and as a sixth component, at least one compound expressed by formula (VII) or formula (VIII).

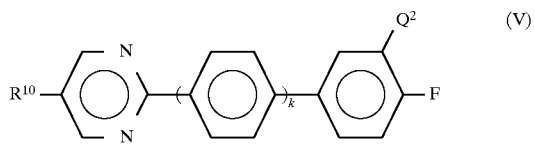
(V)

wherein $R^{10}$ represents an alkyl group having 1 to 10 carbon atoms or an alkenyl group having 2 to 10 carbon atoms; $Q^2$ represents H or F; and k is 0 or 1,

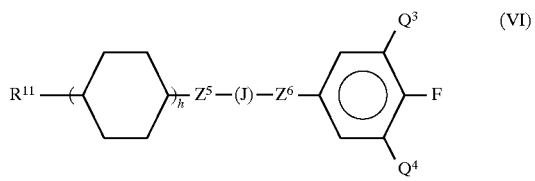
(VI)

wherein $R^{11}$ represents an alkyl group having 1 to 10 carbon atoms or an alkenyl group having 2 to 10 carbon atoms; J represents 1,4-cyclohexylene or 1,4-phenylene; $Q^3$ and $Q^4$ independently represent H or F; $Z^5$ and $Z^6$ independently represent —COO— or single bond; and h is 0, 1, or 2,

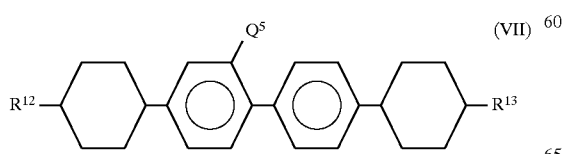
(VII)

wherein $R^{12}$ and $R1^3$ independently represent an alkyl group having 1 to 10 carbon atoms or an alkenyl group having 2 to 10 carbon atoms; and $Q^5$ represents H or F.

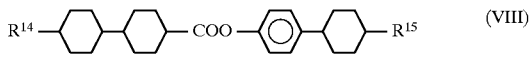
(VIII)

wherein $R^{14}$ and $R^{15}$ independently represent an alkyl group having 1 to 10 carbon atoms or an alkenyl group having 2 to 10 carbon atoms.

By using these liquid crystal compositions of the present invention, liquid crystal display devices which satisfy the objects of the present invention can be obtained.

As suitable examples of the first component used in the liquid crystal compositions of the present invention, compounds expressed by any one of the following formulas (I-1) to (I-3) can be mentioned:

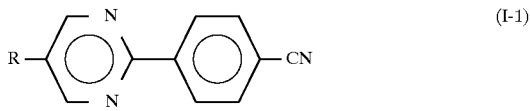
(I-1)

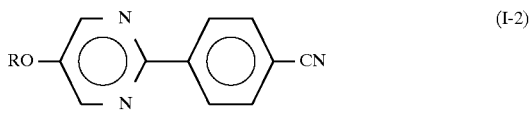
(I-2)

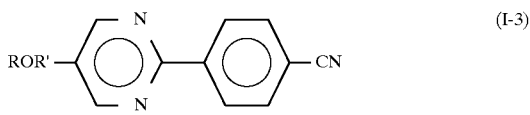
(I-3)

wherein R represents an alkyl group having 1 to 10 carbon atoms or an alkenyl group having 2 to 10 carbon atoms, and R' represents an alkane diyl or alkene diyl having 1 to 9 carbon atoms, provided that the sum of the number of carbon atoms of R and R' is less than 10.

Since the compounds of the first component exhibit a positive and especially large $\Delta\epsilon$ and $\Delta n$, they are used with the purpose of mainly lowering threshold voltage ($V_{10}$) and with the purpose of improving contrast.

Among these compounds, ones expressed by formula (I-1) are preferably used in particular.

Content of the first component is usually 2 to 32% by weight and preferably 2 to 15% by weight based on the total weight of liquid crystal composition. This is because when the content is less than 2% by weight, the effect of decreasing the value of both $\gamma$ and $\tau$ which is an object of the present invention becomes difficult to achieve and conversely, when it exceeds 32% by weight, viscosity of liquid crystal compositions unpreferably becomes high.

Also, as suitable examples of the second component used in the liquid crystal compositions of the present invention, compounds expressed by any one of formula (II-a-1) to (II-a-5) for formula (II-a), formulas (II-b-1) or (II-b-2) for formula (II-b), formulas (II-c-1) to (II-c-5) for formula (II-c), and formula (II-d-1) to (II-d-11) for formulas (II-d), respectively, can be mentioned:

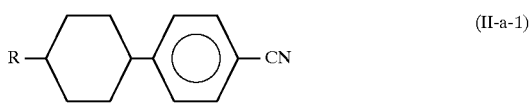
(II-a-1)

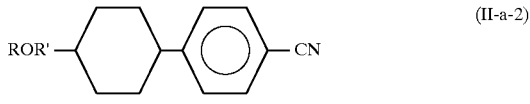
(II-a-2)

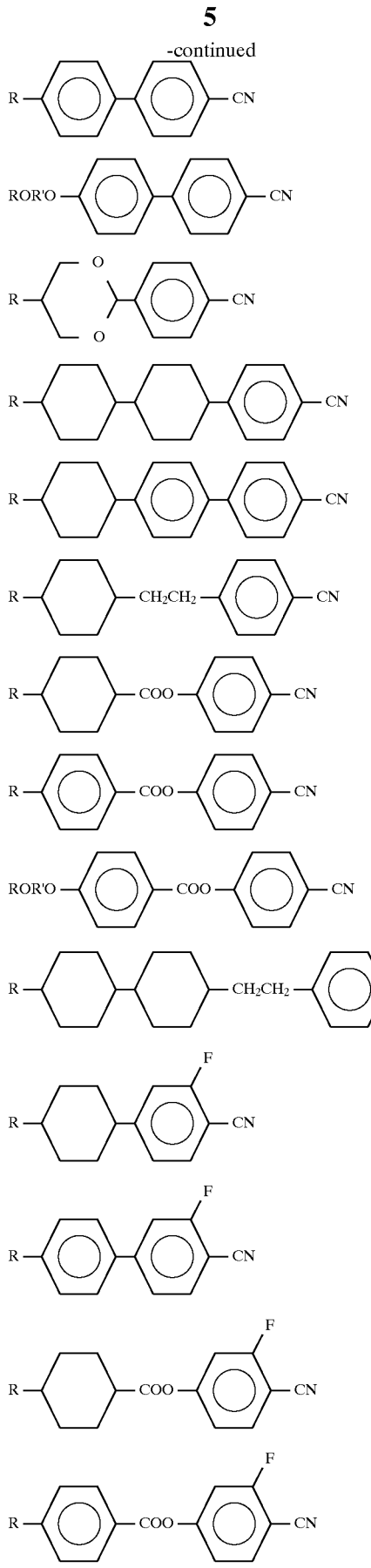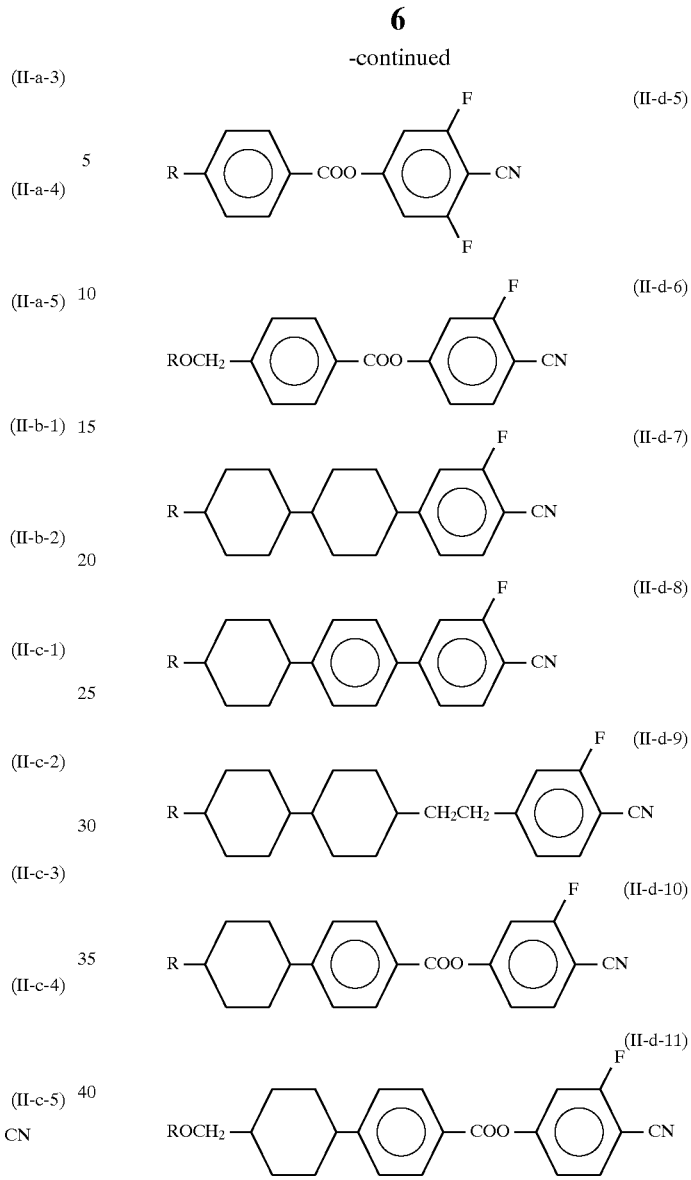

wherein R represents an alkyl group having 1 to 10 carbon atoms or an alkenyl group having 2 to 10 carbon atoms, and R' represents an alkane diyl or alkene diyl having 1 to 9 carbon atoms, provided that the sum of the number of carbon atoms of R and R' is less than 10.

Among these, compounds expressed by any one of formulas (II-a-1), (II-a-2), (II-a-3), (II-a-5), (II-b-1), (II-b-2), (II-c-1), (II-c-6), (II-d-1), (II-d-4), (II-d-5), (II-d-7), (II-d-10), and (II-d-11) are preferably used in particular.

Since the compounds of the second component exhibit a positive and especially large $\Delta\epsilon$, they are used with the purpose of mainly lowering $V_{10}$ and with the purpose of improving steepness which is important as STN characteristic.

Content of the second component is usually 28 to 58% by weight and preferably 28 to 50% by weight based on the total weight of liquid crystal composition. This is because when the content is less than 28% by weight, threshold voltage ($V_{10}$) of liquid crystal compositions becomes high, and conversely, when it exceeds 58% by weight, viscosity of liquid crystal compositions unpreferably becomes high.

As suitable examples of the third component used in the liquid crystal compositions of the present invention, compounds expressed by any one of formulas (III-1) to (III-21)

for formula (III) and any one of formulas (IV-1) to (IV-18) for formula (IV), respectively, can be mentioned.
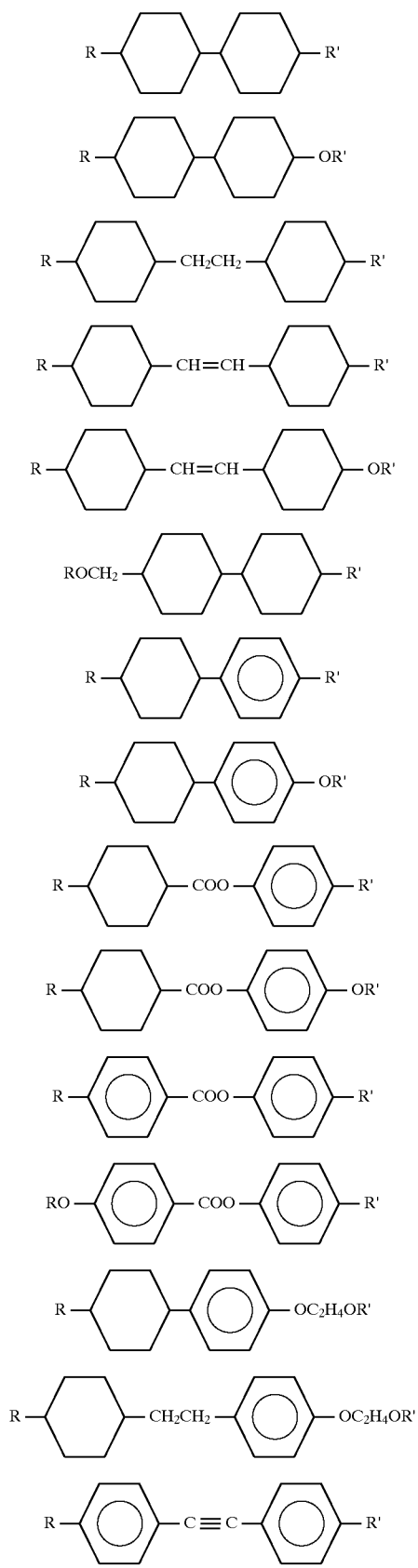
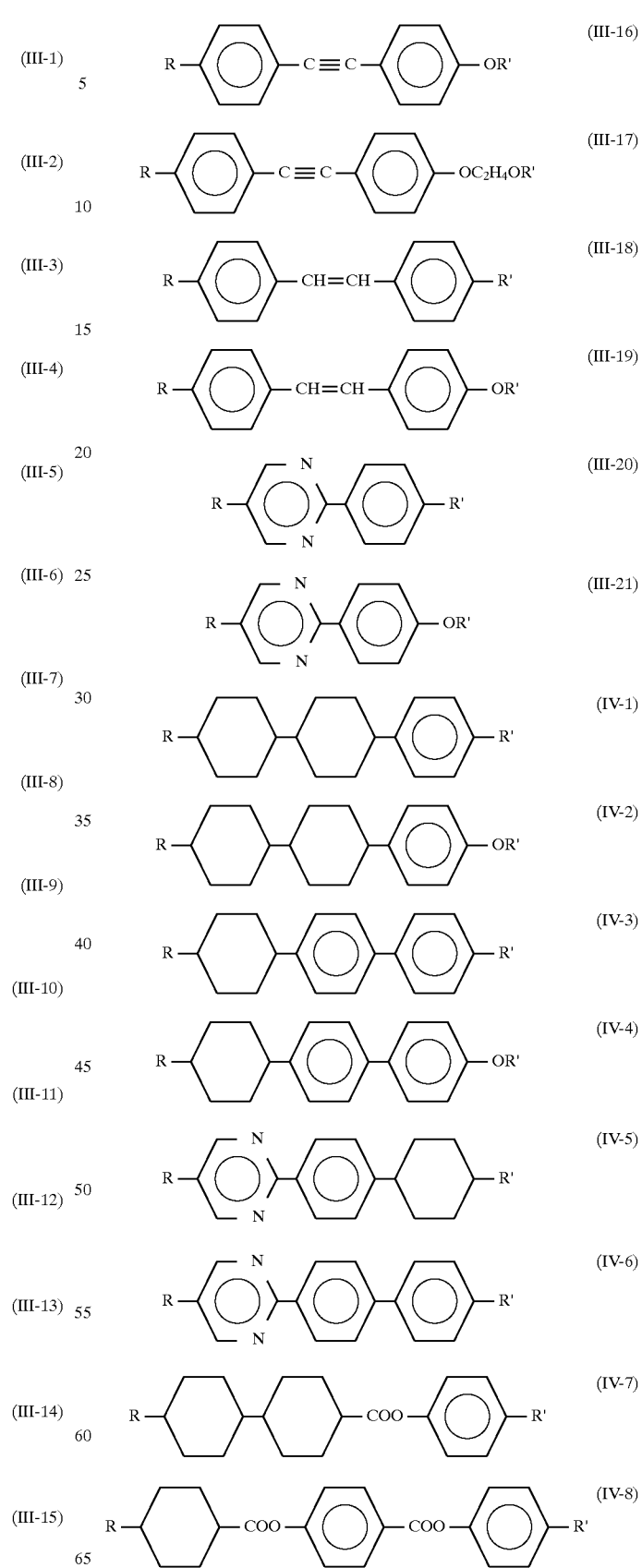

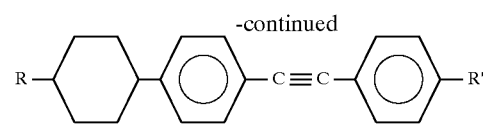
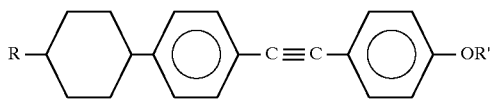
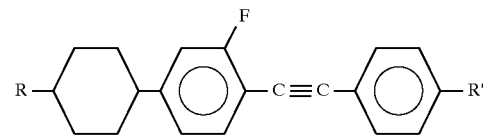
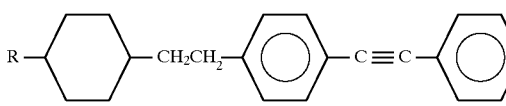
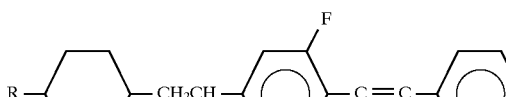
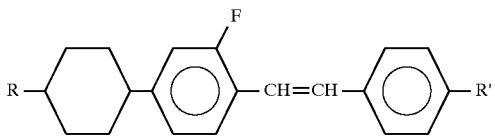
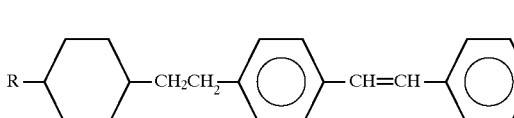
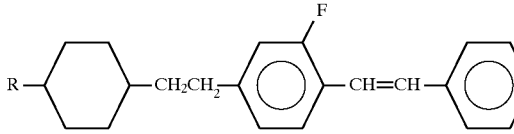
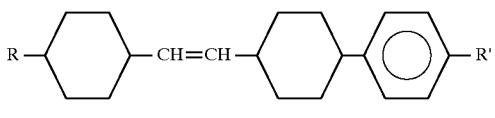
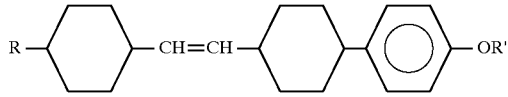

wherein R and R' independently represent an alkyl group or alkenyl group.

Among these, compounds expressed by formula (III-1), (III-2), (III-4), (III-5), (III-6), (III-7), (III-8), (III-9), (III-10), (III-15), (III-16), (III-20), or (III-21), and compounds expressed by formula (IV-1), (IV-2), (IV-5), (IV-9), (IV-11), (IV-12), (IV-14), (IV-15), (IV-16), or (IV-17) are preferably used.

Compounds of the third component are ones exhibiting a negative or small positive $\Delta\epsilon$.

Among those, the compounds expressed by formula (III) are used with the purpose of mainly reducing viscosity and/or of liquid crystal compositions. Further, the compounds expressed by formula (IV) are used with the purpose of widening nematic range by, for instance, raising clearing point of liquid crystal compositions and/or with the purpose of adjusting $\Delta n$ or adjusting viscosity.

Content of the third component is usually 40 to 70% by weight based on the total weight of liquid crystal composition.

This is because when the content is less than 40% by weight, viscosity of liquid crystal compositions becomes high, and conversely, when it exceeds 70% by weight, threshold voltage ($V_{10}$) of liquid crystal compositions becomes unpreferably high.

Fourth component used in the liquid crystal compositions of the present invention is a chiral component selected from optically active compounds, and is used with the purpose of mainly adjusting the pitch of the twist of liquid crystal compositions.

Amount of the chiral compound to be added to liquid crystal compositions is at least one necessary for maintaining the ratio d/P of the cell thickness d ($\mu$m) to the pitch P ($\mu$m) in the range of 0.4 to 0.6. As suitable examples of the chiral compound, cholesteryl nonanoate (hereinafter sometimes referred to as CN) expressed by formula (X) and the optically active compound (hereinafter sometimes referred to as CM-33) expressed by formula (XI) can be mentioned.

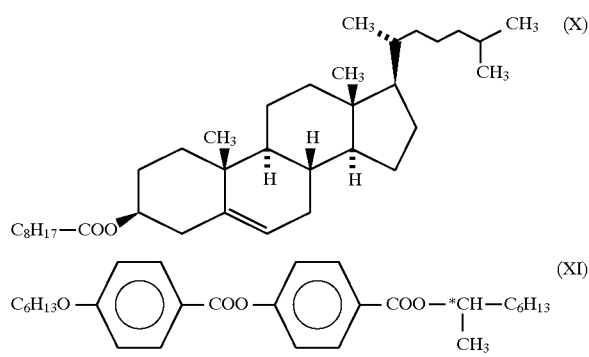

Whereas the content of the fourth component is not necessarily the same due to the difference in mixing ratio of liquid crystal compositions which form a base, the type of chiral compounds, and the cell thickness, it is sufficient to use an amount necessary for controlling the pitch length of twist P to 6 to 18 $\mu$m when the thickness d is 3.5 to 7 $\mu$m which has generally been used, or an appropriate amount exceeding that necessary one. For instance, when the CN or CM-33 mentioned above are used, it is 0.3 to 3 parts by weight and preferably 0.5 to 2.5 parts by weight based on 100 parts by weight of liquid crystal composition which forms the base.

As suitable examples of the fifth component additionally used in the liquid crystal compositions of the present invention, compounds expressed by any one of formulas (V-1) to (V-3) for formula (V), and any one of formulas (VI-1) to (VI-20) for formula (VI) can be mentioned.

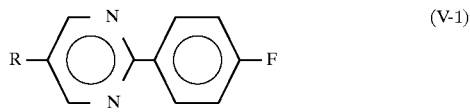
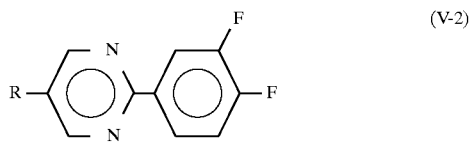

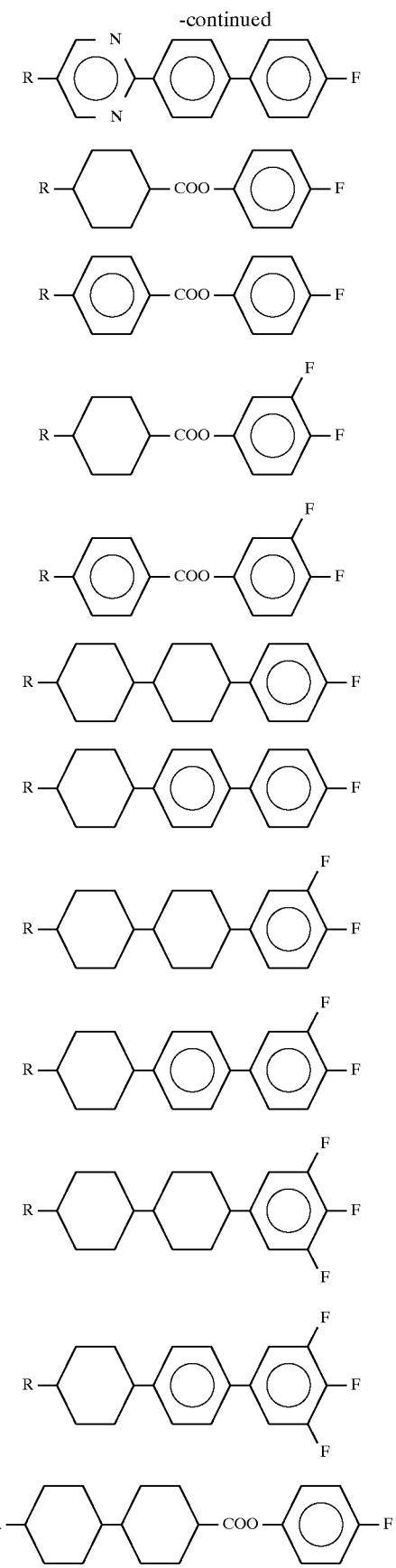
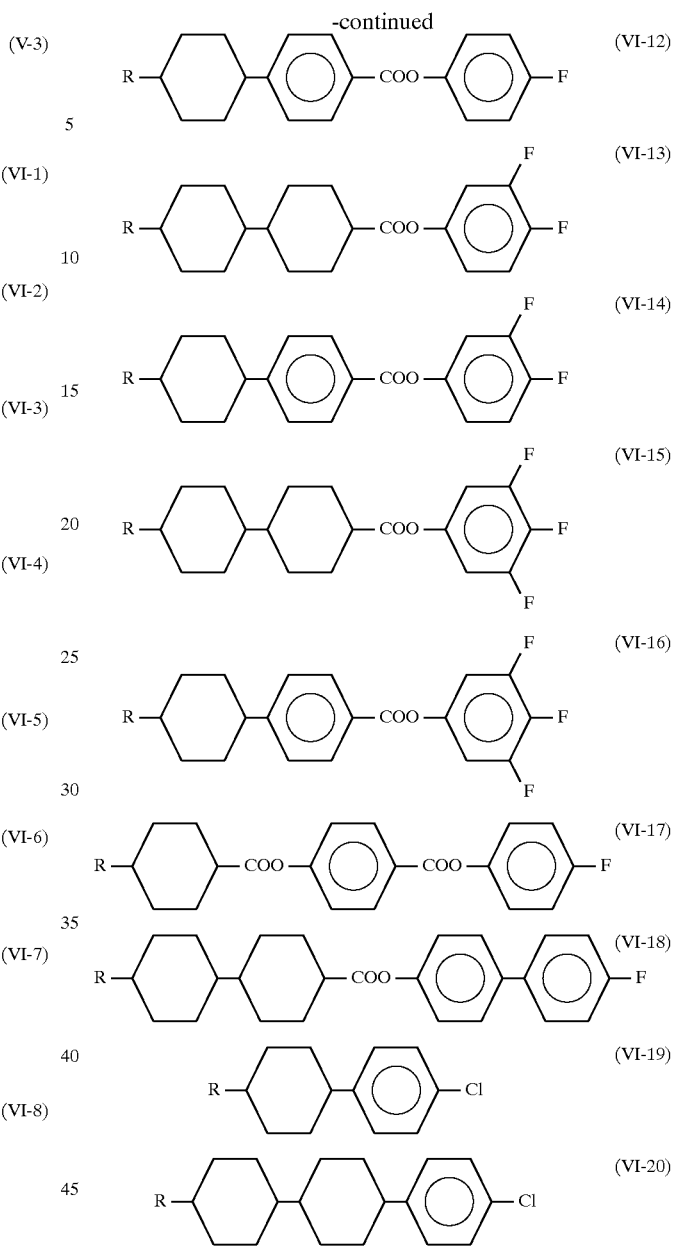

wherein R represents an alkyl group having 1 to 10 carbon atoms.

Among these, compounds expressed by formula (V-1), (V-2), or (V-3), and compounds expressed by formula (VI-1), (VI-5), (VI-6), (VI-7), (VI-8), (VI-9), (VI-10), (VI-11), (VI-12), (VI-13), (VI-14), (VI-15), (VI-16), (VI-18), (VI-19), or (VI-20) are preferably used in particular.

Compounds of the fifth component exhibit a positive $\Delta\epsilon$, and are used with the purpose of particularly lowering $V_{10}$ or improving its temperature dependence. Further, they are used even for the purpose of adjusting viscosity, adjusting $\Delta n$, and expanding nematic range by, for instance, raising clearing point.

Content of the fifth component is preferably less than 35% by weight based on the total weight of liquid crystal composition.

Content of sixth component is preferably less than 25% by weight based on the total weight of liquid crystal composition.

Liquid crystal compositions of the present invention may further comprise an appropriate amount of other compounds, in addition to the fifth an sixth components described above, with the purpose of adjusting characteristics, which are required of liquid crystal display devices, for example, threshold voltage ($V_{10}$), nematic range, $\Delta n$, $\Delta \epsilon$, and viscosity.

Liquid crystal compositions of the present invention can be produced by methods which are conventional by themselves, for instance, by dissolving various components with each other at a high temperature or by dissolving each component in an organic solvent, mixing them, and then distilling off the solvent under a reduced pressure.

Further, improvements depending on intended uses are made by adding suitable additives as required, and optimized. Such additives are well known by persons skilled in the art and described in detail in the literature.

Further, they can also be used as liquid crystal compositions for guest-host (GH) mode if a dichroic dyestuff such as merocyanine type, styryl type, azo type, azomethine type, azoxy type, quinophthalone type, anthraquinone type, and tetrazine type was added. Liquid crystal compositions of the present invention can be used as a NCAP prepared by microencapsulating a nematic liquid crystal, or as liquid crystal compositions for polymer dispersion type liquid crystal display device (PDLCD) typified by a polymer net-work liquid crystal display device (PNLCD) prepared by forming three-dimensional reticulated high polymers in a liquid crystal. Further, they can be used as liquid crystal compositions for electrically controlled birefringence (ECB) mode or dynamic scattering (DS) mode.

BEST MODE FOR CARRYING OUT THE INVENTION

Now, the present invention will be described in more detail with reference to Examples. However, it should be understood that the present invention is by no means restricted to these Examples.

In the compositions in Examples and Comparative Examples, expression of compounds are made by making the groups shown in each of the columns of left side terminal group, bonding group, ring structure, or right side terminal group correspond to those shown in the columns of symbol according to the definition shown in Table 1 below.

Content of each compound was shown in % by weight for primary liquid crystal compositions unless specified otherwise, and was shown by parts by weight of the chiral component based on 100 parts by weight of the primary liquid crystal compositions, for secondary liquid crystal compositions.

Data of liquid crystal compositions were indicated by $T_{NI}$ (clearing point), $T_{SN}$ (smectic-nematic phase transition point), Viscosity (20° C.), $\Delta n$ (optical anisotropy at 25° C.), $V_{10}$ (voltage at 10% transmission), $\gamma$, $\tau$, and d/P.

The $\gamma$ mentioned above is a parameter showing the steepness expressed by $V_{10}/V_{90}$ ($V_{90}$ and $V_{10}$ are obtained by filling a liquid crystal composition in a STN cell having a twist angle of 240° and thickness d of 5.8 to 6.2 μm, and then performing a cell evaluation in yellow mode. That is, voltage-transmission characteristic (V-T characteristic) is determined with a rectangular wave of 70 Hz, and the voltage at 90% transmission was assumed to be $V_{90}$ (V) and the voltage at 10% transmission was assumed to be $V_{10}$ (V).), and the closer to 1 the value of $\gamma$, the more preferable.

TABLE 1

$$R-(-A_1)-Z_1-\ldots-Z_n-(-A_n)-X$$

| 1) Left side terminal group R— | Symbol | 3) Bonding group $-Z_1-$, $-Z_n-$ | Symbol |
|---|---|---|---|
| $C_nH_{2n+1}-$ | n- | $-C_2H_4-$ | 2 |
| $C_nH_{2n+1}O-$ | nO— | $-C_4H_8-$ | 4 |
| $C_nH_{2n+1}OC_mH_{2m}-$ | nOm- | $-COO-$ | E |
| $CH_2=CH-$ | V— | $-C\equiv C-$ | T |
| $CH_2=CHC_nH_{2n}-$ | Vn- | $-CH=CH-$ | V |
| $C_nH_{2n+1}CH=CHC_mH_{2m}-$ | nVm- | $-CF_2O-$ | CF2O |
| $C_nH_{2n+1}CH=CHC_mH_{2m}CH=CHC_kH_{2k}-$ | nVmVk- | $-OCF_2-$ | OCF2 |

| 2) Ring structure $-(-A_1-)-$, $-(-An-)-$ | Symbol | 4) Right side terminal group $-X$ | Symbol |
|---|---|---|---|
| 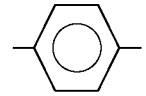 | B | $-F$ | $-F$ |
| 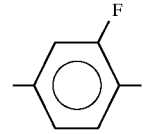 | B(F) | $-Cl$ | $-CL$ |

TABLE 1-continued $$R-(-A_1)-Z_1-\ldots-Z_n-(-A_n)-X$$

| Structure | Symbol | Group | X |
|---|---|---|---|
| F-phenyl-F (2,6-difluoro) | B(F,F) | —CN | —C |
| cyclohexyl | H | —CF$_3$ | —CF3 |
| pyrimidinyl | Py | —OCF$_3$ | —OCF3 |
| dioxanyl | D | —OCF$_2$H | —OCF2H |
| cyclohexyl | Ch | C$_n$H$_{2n+1}$ | -n |
|  |  | —OC$_n$H$_{2n+1}$ | —On |
|  |  | —COOCH$_3$ | —EMe |
|  |  | —C$_n$H$_{2n}$CH═CH$_2$ | -nV |
|  |  | —C$_m$H$_{2m}$CH═CHC$_n$H$_{2n+1}$ | -mVn |

5) Examples of expression

Example 1    3-H2B(F,F)B(F)—F

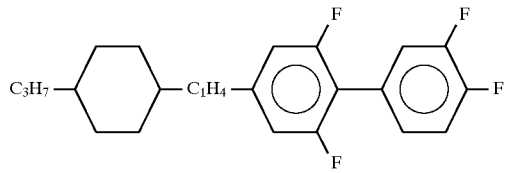

Example 2    3-HB(F)TB-2

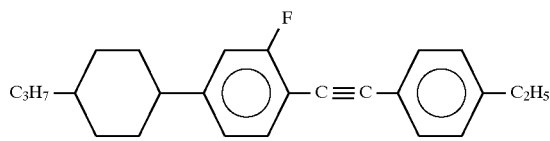

Example 3    1V2-BEB(F,F)—C

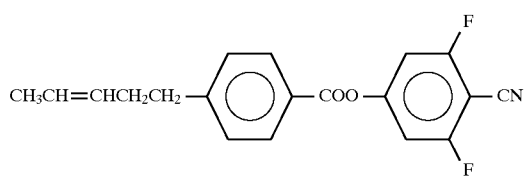

COMPARATIVE EXAMPLE 1

According to Example 3 of the Laid-open Japanese Patent Publication No. Hei 5-32971 mentioned above, the following primary liquid crystal composition was prepared:

| | |
|---|---|
| 5-PyB—C | 10.0% |
| 3V—HB—C | 15.0% |
| 5-HB(F)—C | 5.0% |
| 1O5-HB—F | 5.0% |
| 1O3-HHB—F | 5.0% |

-continued

| | |
|---|---|
| 1O3-HHB(F)—F | 15.0% |
| 1O4-HHB(F)—F | 15.0% |
| 1O5-HHB(F)—F | 15.0% |
| 1O3-HBB—F | 5.0% |
| 1O3-HBB(F)—F | 10.0% |

To 100 parts by weight of the primary liquid crystal composition mentioned above, was added 2.0 parts of the cholesteryl nonanoate expressed by formula (X) mentioned above to prepare a secondary liquid crystal composition.

Characteristics of the secondary liquid crystal composition were determined to find to be as follows:

$T_{NI}$=81.6° C.

$T_{SN}$>−10° C.

Viscosity=27.0 mPa.s

Δn=0.102

$V_{10}$=1.48 V

γ=1.42

τ=520 msec d/P =0.5

COMPARATIVE EXAMPLE 2

According to Example 3 of the Laid-open Japanese Patent Publication No. Hei 5-32971 mentioned above, the following primary liquid crystal composition was prepared:

| | |
|---|---|
| 4-PyB—C | 20.0% |
| 5-PyB—C | 20.0% |
| 3V—HB—C | 25.0% |
| 1V2-HB—C | 20.0% |
| 1O3-HBB—C | 7.0% |
| 1O1-HBB—C | 8.0% |

To 100 parts by weight of the primary liquid crystal composition mentioned above, was added 0.6 part of the optically active compound expressed by the formula (XI) mentioned above to prepare a secondary liquid crystal composition.

Characteristics of the secondary liquid crystal composition were determined to find to be as follows:

$T_{NI}$=80.5° C.

$T_{SN}$>0° C.

Viscosity=44.5 mPa.s

Δn=0.194

$V_{10}$=1.30 V

γ=1.44

τ=530 msec d/P=0.5

EXAMPLE 1

Primary liquid crystal composition comprising the following compounds in the following content was prepared:

| | |
|---|---|
| 5-PyB—C | 10.0% |
| 1V2-BEB(F,F)—C | 8.0% |
| 3-HB—C | 14.0% |
| 3-HB—O2 | 5.0% |
| 3-HH-4 | 11.0% |
| 3-HH-5 | 5.0% |
| 2-HHB-1 | 2.0% |

-continued

| | |
|---|---|
| 3-HHB-1 | 9.0% |
| 3-HHB-3 | 16.0% |
| 3-HHB—O1 | 5.0% |
| 3-H2BTB-2 | 5.0% |
| 3-H2BTB-3 | 5.0% |
| 3-H2BTB-4 | 5.0% |

To 100 parts by weight of the primary liquid crystal composition mentioned above, was added 2.0 parts of the cholesteryl nonanoate expressed by the formula (X) mentioned above to prepare a secondary liquid crystal composition.

Characteristics of the secondary liquid crystal composition were determined to find to be as follows:

$T_{NI}$=100.4° C.

$T_{SN}$>−30° C.

Viscosity=18.4 mPa.s

Δn=0.133

$V_{10}$=2.08 V

γ=1.09

τ=201 msec d/P=0.50

According to this secondary liquid crystal composition, while $T_{NI}$ is raised by about 20° C., $T_{SN}$ is lowered by 20° to 30° C. both compared with those of Comparative Examples 1 and 2, leading to achievement of the expansion of the range of nematic liquid crystal phase. Further, it can be seen that both viscosity and the value of γ are low, and response speed τ can be remarkably improved.

EXAMPLE 2

Primary liquid crystal composition comprising the following compounds in the following content was prepared:

| | |
|---|---|
| 4-PyB—C | 3.0% |
| 5-PyB—C | 3.0% |
| V2-HB—C | 3.0% |
| 3-HB—C | 8.0% |
| 3-HH-4 | 16.0% |
| V—HHB-1 | 8.0% |
| 3-HHB-1 | 10.0% |
| 3-HHB—O1 | 4.0% |
| V—HHB(F)—F | 15.0% |
| 2-BB—C | 9.0% |
| 4-BB—C | 13.0% |
| 4-BTB—O1 | 3.0% |
| 3-HB(F)TB-2 | 3.0% |
| 3-HHEBH-3 | 2.0% |

To 100 parts by weight of the primary liquid crystal composition mentioned above, was added 1.8 parts of the cholesteryl nonanoate expressed by the formula (X) mentioned above to prepare a secondary liquid crystal composition.

Characteristics of the secondary liquid crystal composition were determined to find to be as follows:

$T_{NI}$=82.1° C.

$T_{SN}$>−30° C.

Viscosity=23.3 mPa.s

Δn=0.141

$V_{10}$=2.02 V

γ=1.03

τ=384 msec d/P=0.49

EXAMPLE 3

Primary liquid crystal composition comprising the following compounds in the following content was prepared:

| | |
|---|---|
| 2-PyB—C | 5.0% |
| 5-PyB—C | 4.0% |
| 3-HB—C | 16.0% |
| 2O1-HB—C | 8.0% |
| 3-HH-5 | 10.0% |
| 1O1-HH—3 | 8.0% |
| 2-HHB-1 | 7.0% |
| V2-HHB—1 | 15.0% |
| 3-HHB—O1 | 3.0% |
| 2-HHB(F)—F | 3.0% |
| 3-HHB(F)—F | 3.0% |
| 5-HHB(F)—F | 3.0% |
| 2-H2HB(F)—F | 2.0% |
| 3-H2HB(F)—F | 1.0% |
| 5-H2HB(F)—F | 2.0% |
| 5-HHEB(F)—F | 3.0% |
| 6-HHEB(F)—F | 6.0% |

To 100 parts by weight of the primary liquid crystal composition mentioned above, was added 0.6 part of the optically active compound expressed by the formula (XI) mentioned above to prepare a secondary liquid crystal composition.

Characteristics of the secondary liquid crystal composition were determined to find to be as follows:

$T_{NI}$=85.1° C.
$T_{SN}$>30° C.
Viscosity=18.4 mPa.s
$\Delta$n=0.139
$V_{10}$=2.01 V
$\gamma$=1.04
$\tau$=290 msec
d/P=0.51

EXAMPLE 4

Primary liquid crystal composition comprising the following compounds in the following content was prepared:

| | |
|---|---|
| 2-PyB—C | 2.0% |
| 3-HB—C | 19.0% |
| 2-HB—C | 8.0% |
| V2-HB—C | 11.0% |
| 3-HH-5 | 10.0% |
| 1O1-HH-3 | 8.0% |
| 5-HBB—F | 5.0% |
| 3-HBB-1O1 | 5.0% |
| 5-HBB-1O1 | 10.0% |
| 4-PyBH-2 | 5.0% |
| 5-PyBH-2V | 2.0% |
| 2-BB—C | 2.0% |
| 2-BTB—O1 | 1.2% |
| 3-BTB—O1 | 1.2% |
| 4-BTB—O1 | 1.2% |
| 4-BTB—O2 | 1.2% |
| 5-BTB—O1 | 1.2% |
| 2-BTB-1 | 3.0% |
| 3-HB(F)TB-2 | 4.0% |

To 100 parts by weight of the primary liquid crystal composition mentioned above, was added 1.5 parts of the cholesteryl nonanoate expressed by the formula (X) mentioned above to prepare a secondary liquid crystal composition.

Characteristics of the secondary liquid crystal composition were determined to find to be as follows:

$T_{NI}$=85.5° C.
$T_{SN}$>−30° C.
Viscosity=18.8 mPa.s
$\Delta$n=0.135
$V_{10}$=2.08 V
$\gamma$=1.05
$\tau$=320 msec
d/P=0.41

EXAMPLE 5

Primary liquid crystal composition comprising the following compounds in the following content was prepared:

| | |
|---|---|
| 3-PYB—C | 3.0% |
| 2O1-BEB(F)—C | 8.0% |
| 3-HB—C | 6.0% |
| 5-HB—C | 10.0% |
| 3-HB(F)—C | 5.0% |
| 3-HH-4 | 8.0% |
| 5-HH-2 | 12.0% |
| 3-HB—O4 | 6.0% |
| 2-HHB-1 | 5.0% |
| 3-HHB-1 | 8.0% |
| 3-HBB—F | 7.0% |
| 2-HHB(F)—F | 3.0% |
| 3-HHB(F)—F | 3.0% |
| 5-HHB(F)—F | 3.0% |
| 2-H2HB(F)—F | 2.0% |
| 3-H2HB(F)—F | 1.0% |
| 5-H2HB(F)—F | 2.0% |
| 3-PYBH-3 | 4.0% |
| 3-HHEBH-3 | 4.0% |

To 100 parts by weight of the primary liquid crystal composition mentioned above, was added 2.1 parts of the cholesteryl nonanoate expressed by the formula (X) mentioned above to prepare a secondary liquid crystal composition.

Characteristics of the secondary liquid crystal composition were determined to find to be as follows:

$T_{NI}$=100.5° C.
$T_{SN}$>−30° C.
Viscosity=18.6 mPa.s
$\Delta$n=0.138
$V_{10}$=2.20 V
$\gamma$=1.04
$\tau$=293 msec
d/P=0.55

EXAMPLE 6

Primary liquid crystal composition comprising the following compounds in the following content was prepared:

| | |
|---|---|
| 3-PyB—C | 5.0% |
| 3-BEB(F)—C | 4.0% |
| V—HB—C | 11.0% |
| 3-HB—C | 12.0% |
| 5-HB—C | 3.0% |
| 3-HH-2V1 | 10.0% |
| 5-HH-2 | 5.0% |
| 2-HHB-1 | 11.0% |
| 3-HHB-1 | 3.0% |
| 3-HHB—O1 | 7.0% |
| 3-HBB—F | 7.0% |
| 2-BB—C | 5.0% |

-continued

| 4-BTB—O2 | 6.0% |
| 3-HB(F)TB-2 | 4.0% |
| 3-HB—O2 | 4.0% |
| 1O1-HBBH-3 | 3.0% |

To 100 parts by weight of the primary liquid crystal composition mentioned above, was added 0.7 part of the optically active compound expressed by the formula (XI) mentioned above to prepare a secondary liquid crystal composition.

Characteristics of the secondary liquid crystal composition were determined to find to be as follows:

$T_{NI}$=85.4° C.
$T_{SN}$>30° C.
Viscosity=18.4 mPa.s
Δn=0.135
$V_{10}$=1.98 V
γ=1.05
τ=258 msec
d/P=0.58

INDUSTRIAL APPLICABILITY

As discussed above, according to the present invention, liquid crystal compositions having a small value of γ ($V_{10}/V_{90}$) and a small τ (fast response speed) in order to cope especially with high speed response, while satisfying various characteristics required of STN display mode can be provided.

We claim:

1. A liquid crystal composition comprising, as a first component, a compound expressed by formula (I)

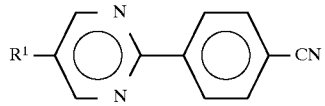  (I)

wherein $R_1$ represents an alkyl group having 1 to 10 carbon atoms and any one or not-adjacent two or more methylene groups (—$CH_2$—) in the alkyl group may be replaced by oxygen atom (—O—) or —CH=CH—, as a second component, at least one compound expressed by any one of formulas (II-a) to (II-d)

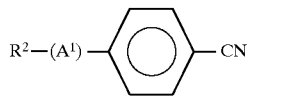  (II-a)

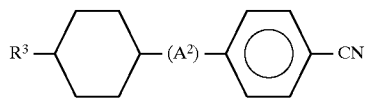  (II-b)

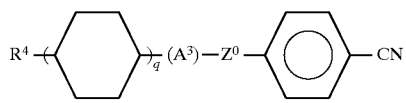  (II-c)

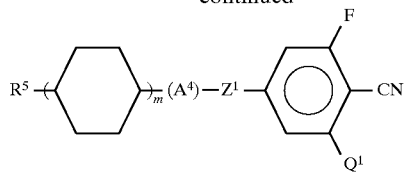  (II-d)

wherein $R^2$, $R^3$, $R^4$, and $R^5$ independently represent an alkyl group having 1 to 10 carbon atoms and any one or not-adjacent two or more methylene groups (—$CH_2$—) in each of the alkyl groups may be replaced by oxygen atom (—O—) or —CH=CH—; $Z^0$ represents —COO— or —$CH_2CH_2$—; $Z^1$ represents —$CH_2CH_2$—, —COO—, or single bond; $Q^1$ represents H or F; $A^1$ represents 1,4-cyclohexylene, 1,4-phenylene, or 1,3-dioxane-2,5-diyl; $A^2$ and $A^3$ independently represent 1,4-cyclohexylene or 1,4-phenylene; $A^4$ represents 1,4-cyclohexylene, or 1,4-phenylene whose H atom at a lateral position may be replaced by F; and q and m are independently 0 or 1, as a third component, at least one compound expressed by formula (III) or formula (IV)

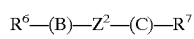  (III)

wherein $R^6$ and $R^7$ independently represent an alkyl group having 1 to 10 carbon atoms and any one or not-adjacent two or more methylene groups (—$CH_2$—) in the alkyl group may be replaced by oxygen atom (—O—) or —CH=CH—; B represents 1,4-cyclohexylene, 1,3-pyrimidine-2,5-diyl, or 1,4-phenylene; C represents 1,4-cyclohexylene or 1,4-phenylene; and $Z^2$ represents —C≡C—, —COO—, —$CH_2CH_2$—, —CH=CH—, or single bond,

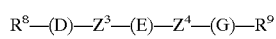  (IV)

wherein $R^8$ and $R^9$ independently represent an alkyl group having 1 to 10 carbon atoms and any one or not-adjacent two or more methylene groups (—$CH_2$—) in the alkyl group may be replaced by oxygen atom (—O—) or —CH=CH—; D represents 1,4-cyclohexylene or 1,3-pyrimidine-2,5-diyl; E represents 1,4-cyclohexylene, or 1,4-phenylene whose H atom at a lateral position may be replaced by F; G represents 1,4-cyclohexylene or 1,4-phenylene; $Z^3$ represents —$CH_2CH_2$— or single bond; and $Z^4$ represents —C≡C—, —COO—, —CH=CH—, or single bond; and as a fourth component, a chiral component in an amount necessary for maintaining the ratio d/P of the cell thickness d (μm) to the pitch length of twist P (μm) in the range of 0.4 to 0.6 when the liquid crystal composition is used for liquid crystal display devices, the content of the third component being 40 to 70% by weight based on the total weight of the liquid crystal composition.

2. The liquid crystal composition according to claim 1 wherein the liquid crystal composition comprises 2 to 32% by weight of the first component, 22 to 58% by weight of the second component, and 40 to 70% by weight of the third component, each based on the total weight of the liquid crystal composition.

3. The liquid crystal composition according to claim 1, which further comprises, as a fifth component, at least one compound expressed by formula (V) or formula (VI)

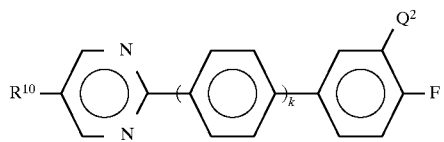

(V)

wherein $R^{10}$ represents an alkyl group having 1 to 10 carbon atoms or an alkenyl group having 2 to 10 carbon atoms; $Q^2$ represents H or F; and k is 0 or 1,

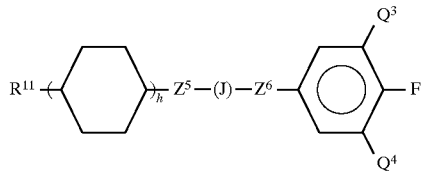

(VI)

wherein $R^{11}$ represents an alkyl group having 1 to 10 carbon atoms or an alkenyl group having 2 to 10 carbon atoms; J represents 1,4-cyclohexylene or 1,4-phenylene; $Q^3$ and $Q^4$ independently represent H or F; $Z^5$ and $Z^6$ independently represent —COO— or single bond; and h is 1 or 2.

4. The liquid crystal composition according to claim 3 wherein the content of the fifth component is less than 35% by weight based on the total weight of the liquid crystal composition.

5. The liquid crystal composition according to claim 1 which further comprises, as a sixth component, at least one compound expressed by formula (VII) or formula (VIII)

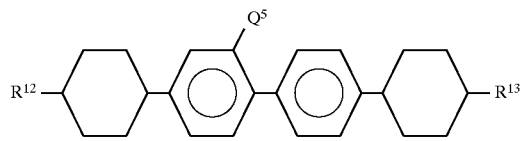

(VII)

wherein $R^{12}$ and $R^{13}$ independently represent an alkyl group having 1 to 10 carbon atoms or an alkenyl group having 2 to 10 carbon atoms; and $Q^5$ represents H or F,

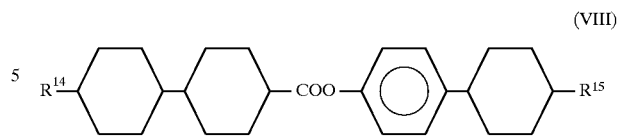

(VIII)

wherein $R^{14}$ and $R^{15}$ independently represent an alkyl group having 1 to 10 carbon atoms or an alkenyl group having 2 to 10 carbon atoms.

6. The liquid crystal composition according to claim 5 wherein the content of the sixth component is less than 25% by weight based on the total weight of the liquid crystal composition.

7. A liquid crystal display device comprising the liquid crystal composition defined in claim 1.

8. A liquid crystal display device comprising the liquid crystal composition defined in claim 2.

9. A liquid crystal display device comprising the liquid crystal composition defined in claim 3.

10. A liquid crystal display device comprising the liquid crystal composition defined in claim 4.

11. A liquid crystal display device comprising the liquid crystal composition defined in claim 5.

12. A liquid crystal display device comprising the liquid crystal composition defined in claim 6.

* * * * *